(12) United States Patent
Brugler et al.

(10) Patent No.: US 7,971,103 B2
(45) Date of Patent: Jun. 28, 2011

(54) CONTEXTUAL AND INLINE ERROR RESOLUTION AND USER COMMUNITY

(75) Inventors: Thomas S. Brugler, Fuquay-Varina, NC (US); Todd M. Eischeid, Cary, NC (US); Mark E. Molander, Cary, NC (US); Kerry A. Ortega, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 12/355,414

(22) Filed: Jan. 16, 2009

(65) Prior Publication Data

US 2010/0185905 A1   Jul. 22, 2010

(51) Int. Cl.
*G06F 11/00* (2006.01)
(52) U.S. Cl. .......................................... 714/48; 714/57
(58) Field of Classification Search .................... 714/48, 714/57
See application file for complete search history.

(56) References Cited

U.S. PATENT DOCUMENTS

| | | | | |
|---|---|---|---|---|
| 6,671,818 B1 * | 12/2003 | Mikurak | ............................ | 714/4 |
| 6,834,257 B2 * | 12/2004 | Keller | ............................ | 702/183 |
| 7,290,181 B2 * | 10/2007 | D'Angelo et al. | .............. | 714/48 |
| 7,739,554 B2 * | 6/2010 | Van Riel et al. | ................ | 714/48 |
| 2005/0166148 A1 * | 7/2005 | Garding | ......................... | 715/708 |
| 2007/0011498 A1 * | 1/2007 | Shaffer et al. | .................... | 714/48 |
| 2008/0091984 A1 * | 4/2008 | Hite et al. | ......................... | 714/57 |
| 2008/0209280 A1 * | 8/2008 | Dilillo et al. | ..................... | 714/48 |
| 2008/0256400 A1 * | 10/2008 | Yang et al. | ....................... | 714/57 |
| 2010/0058120 A1 * | 3/2010 | Coleman et al. | ................ | 714/57 |
| 2010/0115348 A1 * | 5/2010 | Gilluwe | ........................... | 714/57 |
| 2010/0138704 A1 * | 6/2010 | Johnson et al. | ................. | 714/57 |
| 2010/0199132 A1 * | 8/2010 | Compton et al. | ............... | 714/57 |

* cited by examiner

*Primary Examiner* — Marc Duncan
(74) *Attorney, Agent, or Firm* — Cantor Colburn LLP; Randall Bluestone

(57) ABSTRACT

An event log system for capturing event information associated with error events occurring within a computer system. The event log system includes an event log displaying error messages associated with the error events captured within the computer system, and displaying inline error resolution information within each error message corresponding to each respective error event. User community information such as links to wiki topics and forum threads are contextually provided for and inline with individual error log entries. Also, action buttons to help the user resolve errors and problems are also contextually provided, as are surfaced links to domain experts within the user community, such as online chat buttons to them.

3 Claims, 5 Drawing Sheets

| INDEX | SEV | SOURCE | DATE/TIME | TEXT |
|---|---|---|---|---|
| 1 | E | SERVPROC | 01/26/08, 13:00:05 | BLADE 9 VPD CANNOT BE READ |
| 2 | E | SERVPROC | 01/26/08, 12:59:04 | BLADE 7 VPD CANNOT BE READ |
| 3 | W | SERVPROC | 01/26/08, 12:53:37 | EVENT LOG FULL |
| 4 | E | SERVPROC | 01/26/08, 12:46:07 | FIRMWARE UPDATE OF ADVANCED MANAGEMENT MODULE FROM 9.44.146.149 (WEB) FAILED FOR USER MIKENOL: FIRMWARE IMAGE IS NOT MEANT FOR THE TARGET SYSTEM. |
| 5 | E | SERVPROC | 01/25/08, 11:13:11 | BLADE 13 VPD CANNOT BE READ |
| 6 | E | SERVPROC | 01/25/08, 11:12:48 | BLADE 9 VPD CANNOT BE READ |
| 7 | W | SERVPROC | 01/25/08, 11:07:55 | EVENT LOG FULL |
| 8 | W | SERVPROC | 01/24/08, 20:34:25 | EVENT LOG FULL |
| 9 | W | SERVPROC | 01/23/08, 16:55:31 | EVENT LOG FULL |
| 10 | W | SERVPROC | 01/23/08, 14:49:21 | EVENT LOG FULL |
| 11 | W | SERVPROC | 01/23/08, 13:57:54 | EVENT LOG FULL |
| 12 | W | SERVPROC | 01/23/08, 13:35:57 | EVENT LOG FULL |
| | | | | END OF LOG. |

FIG. 1
PRIOR ART

| INDEX | SEV | SOURCE | DATE/TIME | TEXT | USER COMMUNITY | |
|---|---|---|---|---|---|---|
| 1 | E | SERVPROC | 01/26/08, 13:00:05 | BLADE 9 VPD CANNOT BE READ | ACME: IGNORABLE... IBM: IMPORTANT IF... | ☐ ACME IT |
| 2 | E | SERVPROC | 01/26/08, 12:59:04 | BLADE 7 VPD CANNOT BE READ | ACME: IGNORABLE... IBM: IMPORTANT IF... | ☐ ACME IT |
| 3 | W | SERVPROC | 01/26/08, 12:53:37 | EVENT LOG FULL | ACME: IGNOR THIS - NOTHING CAN BE DONE ABOUT IT | |
| 4 | E | SERVPROC | 01/26/08, 12:46:07 | FIRMWARE UPDATE OF AMM FAILED | ▶7 THREADS    UPDATE WIKI    ☐ IBM LEV2  ☐ AMM WIZ<br>SALLY: 1ST THING YOU GOT TO DO IS... | |
| 5 | E | SERVPROC | 01/25/08, 11:13:11 | BLADE 13 VPD CANNOT BE READ | ACME: IGNORABLE... IBM: IMPORTANT IF... | ☐ ACME IT |
| 6 | E | SERVPROC | 01/25/08, 11:12:48 | BLADE 9 VPD CANNOT BE READ | ACME: IGNORABLE... IBM: IMPORTANT IF... | ☐ ACME IT |
| 7 | W | SERVPROC | 01/25/08, 11:07:55 | EVENT LOG FULL | ACME: IGNORE THIS - NOTHING CAN BE DONE ABOUT IT | |
| 8 | W | SERVPROC | 01/24/08, 20:34:25 | EVENT LOG FULL | ACME: IGNORE THIS - NOTHING CAN BE DONE ABOUT IT | |
| 9 | W | SERVPROC | 01/23/08, 16:55:31 | EVENT LOG FULL | ACME: IGNORE THIS - NOTHING CAN BE DONE ABOUT IT | |
| 10 | W | SERVPROC | 01/23/08, 14:49:21 | EVENT LOG FULL | ACME: IGNORE THIS - NOTHING CAN BE DONE ABOUT IT | |
| 11 | W | SERVPROC | 01/23/08, 13:57:54 | EVENT LOG FULL | ACME: IGNORE THIS - NOTHING CAN BE DONE ABOUT IT | |
| 12 | W | SERVPROC | 01/23/08, 13:35:57 | EVENT LOG FULL | ACME: IGNORE THIS - NOTHING CAN BE DONE ABOUT IT | |

END OF LOG.

FIG. 2

CONTEXTUAL AND INLINE ERROR RESOLUTION AND USER COMMUNITY

BACKGROUND

The present invention relates to an event log system within computer systems, and more specifically, to providing contextual and inline error resolutions within event log entries displayed in an event log system within a computer system, for example.

Errors frequently occur within computer systems. Detected errors are typically compiled by a processor which logs the errors in an event log. The event log entries refer to an error or critical event and state the error which has occurred. The event log may be examined to help determine the failure. As shown in FIG. 1, an event log 100 according to the conventional art is provided. The event log 100 includes an index column 105 providing index information, an error severity column 110 indicating the severity of the error, a source column 115 indicating the source, date/time information column 120 and a text column 125 indicating a textual description of the problem that has occurred. As shown in FIG. 1, the conventional event log 100 includes a plurality of event log entries 130 which provide error messages including general information regarding each error event.

The conventional event log 100 typically fails to state the problem in a manner for users to fully understand the error and fails to provide enough information to solve the error. Therefore, the users often do not have sufficient information in the error messages to fix the problems or they forget how to fix a problem that has occurred in the past. Problem determination and resolution is typically and persistently one of the most difficult problems for system administrators. Users frequently need help from others to solve unclear or unfamiliar problems, therefore, the users are required to link to different websites, for example, to retrieve information regarding how to solve the problem.

SUMMARY

An embodiment of the present invention provides an event log system that provides contextual and inline error resolution via a user community, within the error log on an on-demand basis and directly from the error message, where users can initiate a discussion thread on any specific error message as well as view previous user or subject-matter-expert discussions and tips, and access actions on how to resolve the errors which have occurred.

According to an embodiment of the present invention, an event log system for capturing event information associated with error events occurring within a computer system is provided. The event log system includes an event log displaying error messages associated with the error events captured within the computer system, and displaying inline error resolution information within each error message corresponding to each respective error event.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1 is a table illustrating a conventional event log.

FIG. 2 is a table illustrating an event log that can be implemented within embodiments of the present invention.

DETAILED DESCRIPTION

Figure 3:
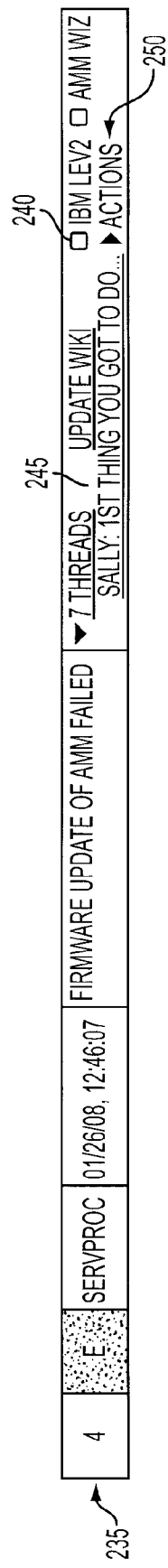
FIG. 3 illustrates a portion of the table shown in FIG. 2 that can be implemented within embodiments of the present invention.

With reference now to FIG. 2, there is an event log system for capturing event information associated with error events occurring within a computer system, the event log system includes an event log 200 according to an embodiment of the present invention. The event log 200 may be used in any operating system environment which logs errors. The event log 200 includes an index column 205, a severity column, a source column 215, date/time information column 220, a text column 225 including textual information corresponding to an error that has occurred and a user community column 230 which provides additional information to the user as to how to fix the problem such as company notes regarding the problem and IT recommendations, for example. According to an embodiment of the present invention, as shown in FIG. 2, the event log 200 displays a plurality of event log entries 235 (i.e., error messages 235) associated with the captured error events, and displays inline error resolution information within each error message 235 corresponding to each respective error, in the user community column 230 of the event log 200. Therefore, according to an embodiment of the present invention, solutions to error events which have occurred are directly integrated into the event log 200. That is, the solutions may be viewed in the user community column 230 of the event log 200, for example.

Further, according to an embodiment of the present invention, the inline error resolution information may be provided from local and remote networks. As shown in FIG. 2, the company e.g., ACME provides IT recommendations from within the company, and IT recommendations from an external source such as IBM Corporation, for example, via the user community column 230.

Further, according to an embodiment of the present invention, the inline resolution information includes user community information to be accessed by a user. The user community information includes real-time chat links 240, for example, ACME IT or AMM Wizard (as indicated by the boxes) for the user to directly participate in online chat environments regarding a respective error event and forum information 245 regarding the respective error event, accessible by the user. The chat links 240 enable a user to communicate with other domain experts. The forum information 245 includes related discussion threads between other users participating in a forum. According to an embodiment of the present invention, users may subscribe to the forum. Further, community-source information in the form of a wiki is accessible via the "update wiki" link as shown, which would lead to the "Firmware Update" section of the wiki.

According to another embodiment of the present invention, a database of information may be built up over time for errors and associated resolutions which are repetitive such that the user may also view this information in a wiki format, for example.

In addition to the user community information mentioned above, the error messages 235 also include action information which may be performed by the user in accordance with alternative embodiments of the present invention. FIG. 3 is an example of an error message 235 included in the event log 200. Specifically, FIG. 3 illustrates the error message 235 corresponding with index #4 and a "firmware update of AMM failed" error event. The event log 200 includes an actions link 250 which provides various actions to be performed by the user and corresponding to the respective error event.

Figure 4:
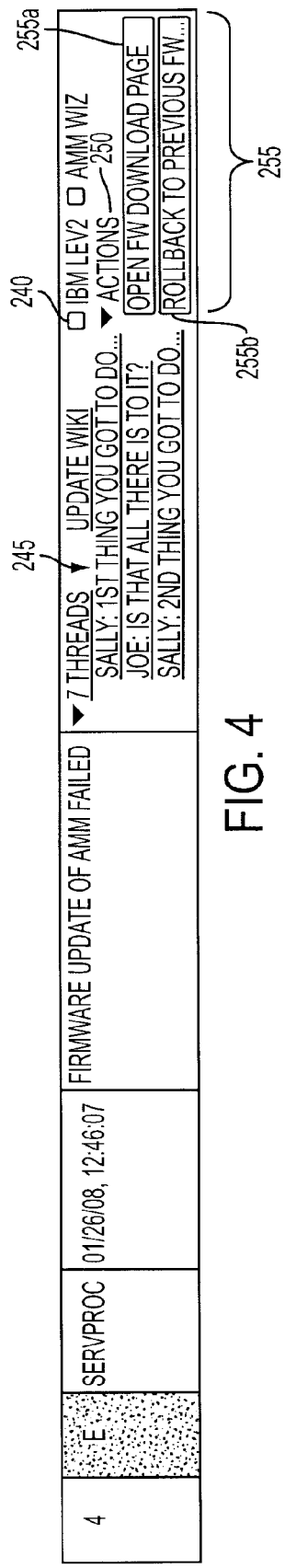
FIG. 4 illustrates another portion of the table shown in FIG. 2 that can be implemented within embodiments of the present invention.

When selected by the user, the actions link 250 provides actions 255 that could potentially resolve the problem indicated by the error message as shown in FIG. 4, for responding the respective error event which has occurred. As shown in FIG. 4, actions 255 are displayed to the user, via the user community column 230, to assist the user in correcting the error event which has occurred. The first action 255a opens a Firmware download page to new firmware, and a second action 255b allows the user to rollback to a previous firmware version already on the system. The present invention is not limited to any particular type or number of actions provided to the user. Further, according to an embodiment of the present invention, the actions 255 provided are related to the respective error event in order to resolve the respective error event that has occurred.

Also, shown in FIG. 4, a thread discussion 245 including series of threads (e.g., forum or blog) is provided linking to a user community. According to this embodiment, the event log 200 is expanded to show forum threads in a tree-format, for example, to allow the user to view an error and also view past suggestions and responses for the specific problem which has occurred. When the user clicks to expand the log, the application goes out to a server (not shown) and obtains the forum information for the event ID and then fills the event item in an ordered format. According to an embodiment of the present invention, this information is integrated with the solutions within the event log 200, instead of linking into a new browser window at a different site.

Figure 5:
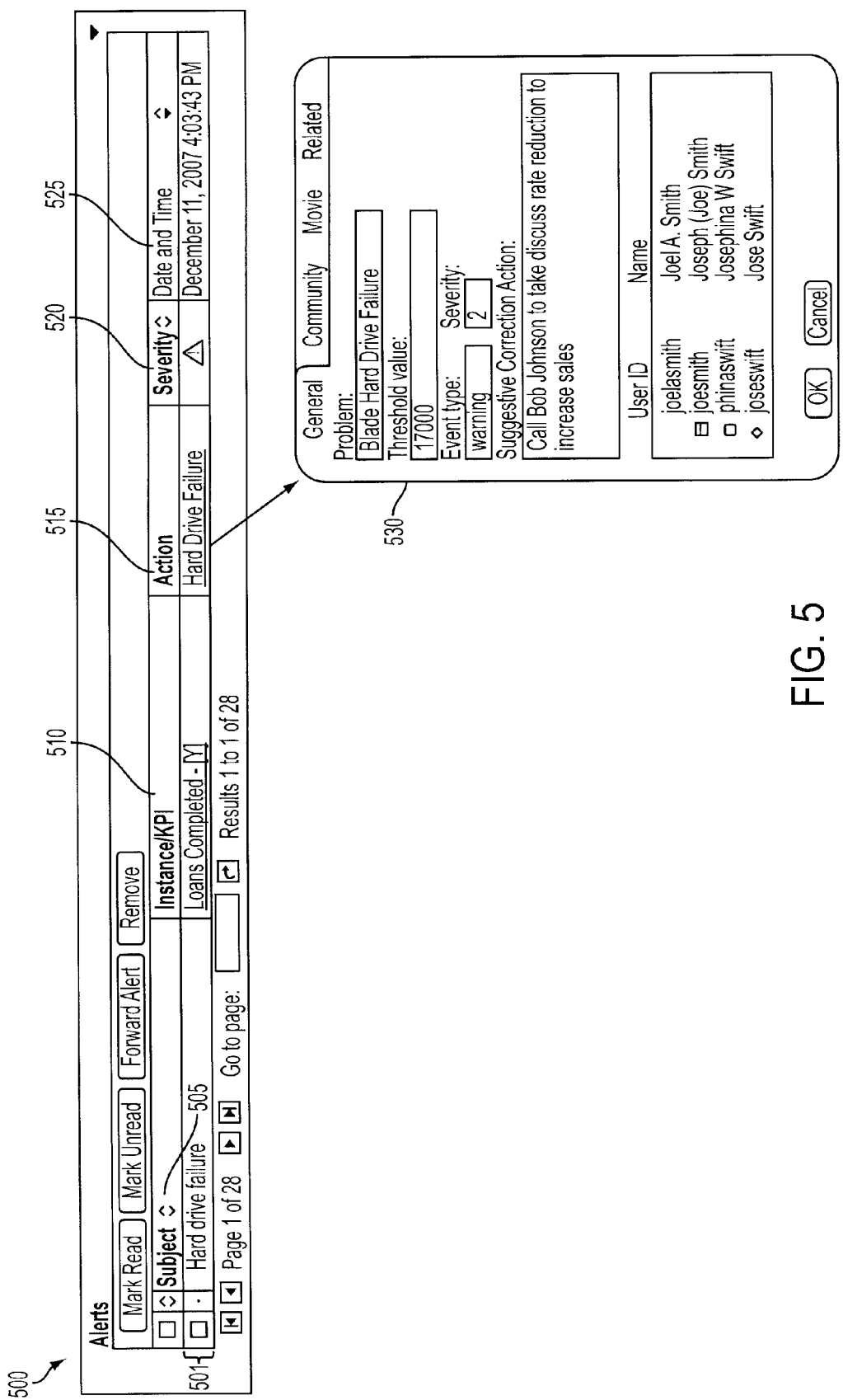
FIG. 5 is a diagram illustrating an event log that can be implemented within alternative embodiments of the present invention.

FIG. 5 illustrates an event log according to an alternative embodiment of the present invention. As shown in FIG. 5, the event log 500 provides the user with a subject column 505, instance/KPI column 510, actions column 515, and severity of the action column 520 along with a date/time column 525. As shown in FIG. 5, the event log 500 includes at least one error message 501. In the event log 500, the action column 515 provides the user with a popup window or screen area 530, for example, which provides general information associated with the error event including a detailed description of the problem, threshold information predetermined by a user to indicate when the user wants to view the respective error message, an event type such as severe, warning, or informational along with the severity level also predetermined or settable by a user, and suggestive corrective action and user ID and name information of other users who have experience similar problems and receiving the same error message. When selected by a user, the screen area 530 also provides "Community" information such as thread discussions and online chats, "Movie" information such as a tutorial or user-defined movies showing someone performing the steps on how to fix the problem or how to perform it, and "Related" information which may include a plurality of links to related information, for example.

Since the event log according to embodiments of the present invention provides inline resolution information, links and actions, the present invention provides the advantages including a faster and higher quality real-world resolution to system problems, lower costs for users and a tighter user community for multiple domains.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An event log system for capturing event information associated with a plurality of error events occurring within a computer system, the event log system comprising:

an event log displaying a plurality of error messages associated with the plurality of error events captured within the computer system, and displaying inline error resolution information within each error message corresponding to each respective error event, wherein the event log comprises a plurality of action links, each action link providing an action for resolving a respective error event of the plurality of error events, wherein in the event an action link is selected by the user, a corrective action associated with the respective error event is launched, and wherein the event log further includes a screen area providing threshold information predetermined by a user regarding when to display a respective error message, event type and severity information, suggestive corrective actions, user information associated with other users receiving a same error message, and movie information including a tutorial related to a respective error message.

2. The event log system of claim 1, wherein the inline error resolution information is provided from local and remote networks.

3. The event log system of claim 2, wherein the inline resolution information comprises user community information to be accessed by a user, the user community information including real-time chat links for the user to participate in online chat environments regarding a respective error event and forum information regarding the respective error event, accessible by the user.

* * * * *